United States Patent [19]

Harder

[11] 4,037,077

[45] July 19, 1977

[54] BATTERY WELDING METHOD

[75] Inventor: Steven H. Harder, Denver, Colo.

[73] Assignee: The Gates Rubber Company, Denver, Colo.

[21] Appl. No.: 710,756

[22] Filed: Aug. 2, 1976

[51] Int. Cl.² .............................................. B23K 9/08
[52] U.S. Cl. ..................................... 219/123; 219/75; 219/125 R; 219/137 R
[58] Field of Search ............... 219/123, 125 R, 137 R, 219/75; 429/178

[56] References Cited
U.S. PATENT DOCUMENTS 3,806,696   4/1974   Young .............................. 219/75 X Primary Examiner—E. A. Goldberg
Attorney, Agent, or Firm—Curtis H. Castleman, Jr.; Raymond Fink; H. W. Oberg, Jr.

[57] ABSTRACT

A welding method for joining lead parts together in a lead-based battery is disclosed using an inert gas-shielded, non-consumable electrode and an ingot-like mold surrounding the lead parts to be fused. The electrode arc is struck substantially directly over the lead parts and the electrode arc is passed in a line type weld longitudinally over the lead part for more than one full pass, whereby the lead parts flow together and are confined by the surrounding mold.

5 Claims, 5 Drawing Figures

BATTERY WELDING METHOD

BACKGROUND OF THE INVENTION

This invention relates to welding of lead battery parts together, especially intra- and inter-cell connections, and is effective for welding relatively thin lead battery components to relatively thick lead battery components utilizing a modified arc casting technique.

Traditionally, lead parts in electrochemical cells in batteries have been joined by either a burning process or a gas welding process. An improved process employing arc welding with an inert-gas-shielded non-consumable electrode is disclosed in U.S. Pat. No. 3,806,696 to Young et al. In the Young et al method, an ingot-like mold of good thermal conductivity, arc resistance, and other suitable properties is positioned around the parts to be welded, the electrode arc is struck and passed over the lead parts while simultaneously oscillating the arc back and forth across the surface to be welded. The patent to Young et al discloses striking the arc short of the weldable surface and then transversely oscillating the arc over such surface. It has also been common in other processes using TIG (tungsten-inert-gas) welding to oscillate the arc, either mechanically or magnetically laterally over the surface to be welded, as shown for instance in U.S. Pat. No. 3,646,309 to Smith, Jr.

While the Young et al process was found to be very reliable for welding expanded mesh lead current collector tabs to solid lead post connectors, it was found that the process was not nearly so reliable for welding solid current collector tabs to the lead posts; in the case of welding the solid current collector tabs, the welds were nonuniform and resulted in an intolerably high rejection rate.

It is an object of the present invention to overcome problems inherent in prior art methods for joining lead parts together in a battery construction, and to provide a relatively pore-free, low internal impedance weld using a very rapid process with a minimum or total absence of moving parts.

SUMMARY OF THE INVENTION

Briefly described, in the method of the invention the lead parts are joined together by passing an electrode arc derived from an inert-gas-shielded non-consumable electrode across the lead parts to be joined to at least partially melt them, the flow of the melted lead parts being contained by a highly heat conductive mold acting as a rapid heat sink, and which surrounds the lead parts. The improvement primarily lies in (1) striking the electrode arc substantially directly over the lead parts, and (2) passing the electrode arc in substantially a straight line over the lead parts longitudinally thereof, for greater than one full pass across the lead parts, at a speed and current to cause the lead parts to flow and weld together in a uniform manner and be confined by the mold means.

While not so limited, the method of the invention is especially effective for welding relatively thin (low heat capacity) pure lead battery components to relatively thick (high heat capacity) pure lead battery components forming intra-cell and inter-cell connections in lead-acid batteries.

BRIEF DESCRIPTION OF THE DRAWINGS

The invention will be more particularly described with reference to the accompanying drawings, wherein like numerals refer to like parts, and in which.

PREFERRED EMBODIMENTS OF THE INVENTION

Figure 1:
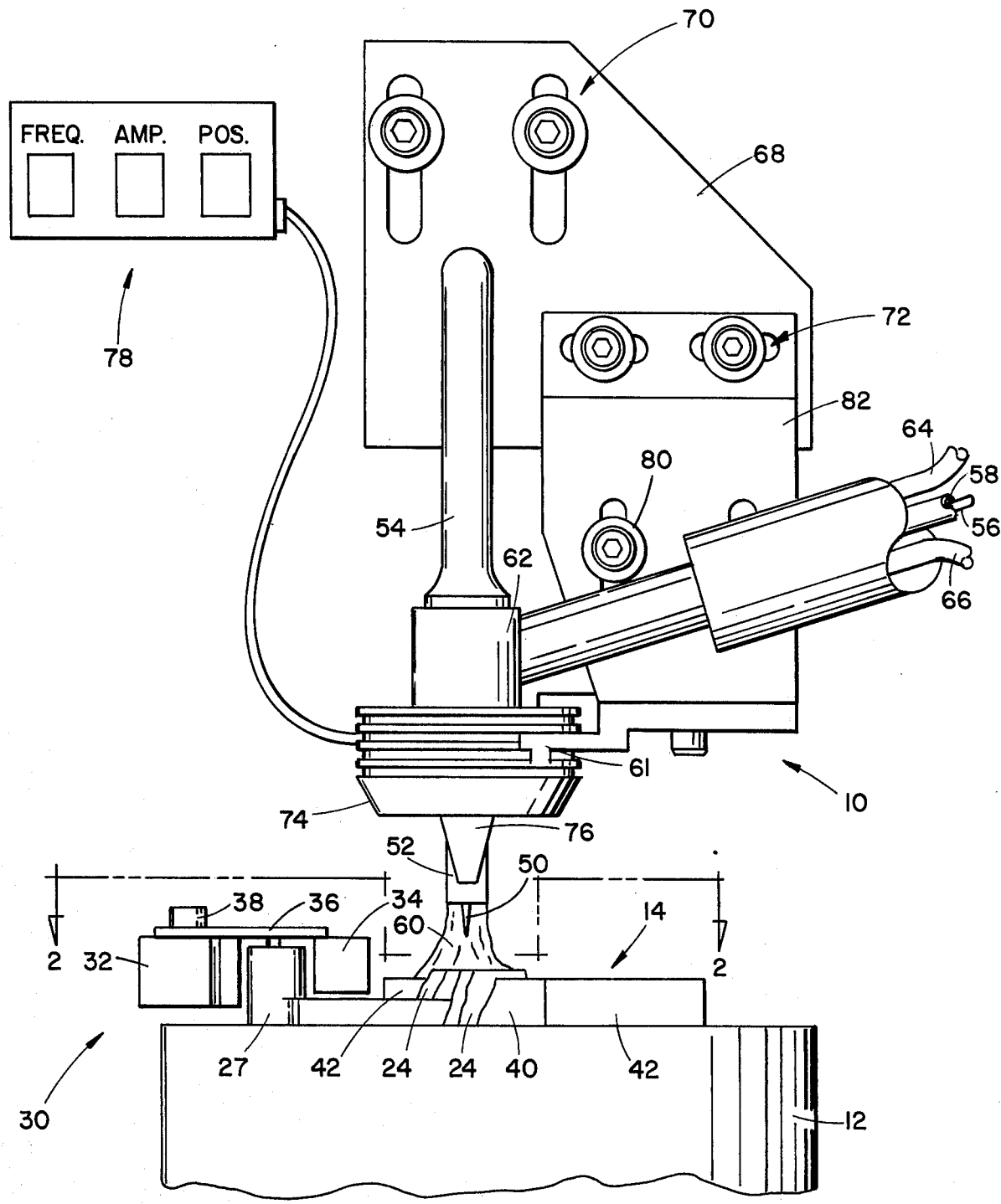
FIG. 1 depicts apparatus useful for carrying out the method of the invention.

For illustrative purposes only, the invention will be described in one of its preferred embodiments as applied to making an intra-cell connection between the electrodes and terminal posts of a lead-acid electrochemical cell. With respect to the features held in common with the aforementioned Young et al U.S. Pat. No. 3,806,696, it is hereby incorporated by reference.

Referring now to the Figures, there is shown generally at 10 a welding apparatus or station below which fixture 12 holding work piece 14, may be moved into position for a welding operation. The holding fixture 12 has axially positioned therein a cylindrical electrochemical cell pack subassembly 16. The cell pack shown is comprised of spirally wound positive 18 and negative lead plates 20 and interleaved porous absorbent separator material 22. Obviously, various other types and figurations of cell subassemblies where lead parts need to be joined, such as parallel stacked cell plates, would be amenable to the welding method of the invention.

The electrode plates 18, 20 of the cell subassembly 16 are, by way of example, formed of an expanded mesh, lead foil, perforated grid or other suitable substrate upon which is affixed the eletrochemically active positive and negative lead material, usually in paste form. In a conventional manner, the grid substrate of each plate has a plurality of integral current collector tab extensions 24 made of lead. As shown, each opposite polarity plate contains a plurality (four shown) of such upstanding current collector tabs spaced apart and exiting from one side of an end of the cell pack. On the opposite side of the cell pack are shown four similar current collector tabs 24' extending from the corresponding opposite polarity plate, the upper portions of which are shown already welded to the associated lead post 26, according to the present invention.

The lead connecting posts 25, 26 which are straddled by the current collector tabs and which are relatively large and have a high heat capacity compared with the tabs, carry, at one end thereof, post barrels 27, 28 adapted to receive within their central cavity a connector means, for making a sealed through-the-partition connection to the terminals of the battery, as shown for instance in detail in McClelland et al U.S. Pat. No. 3,704,173.

When carrying out the welding method of the invention, the post barrels are indexed into position and shielded from the weld arc by a retractable locator mechanism 30 mounted to a frame (not shown). This locator includes adjacent side clamps 32, 34, and a biasing spring clip 36 pivotally mounted at 38 for movement into and out of position over the post barrel.

Figure 2:
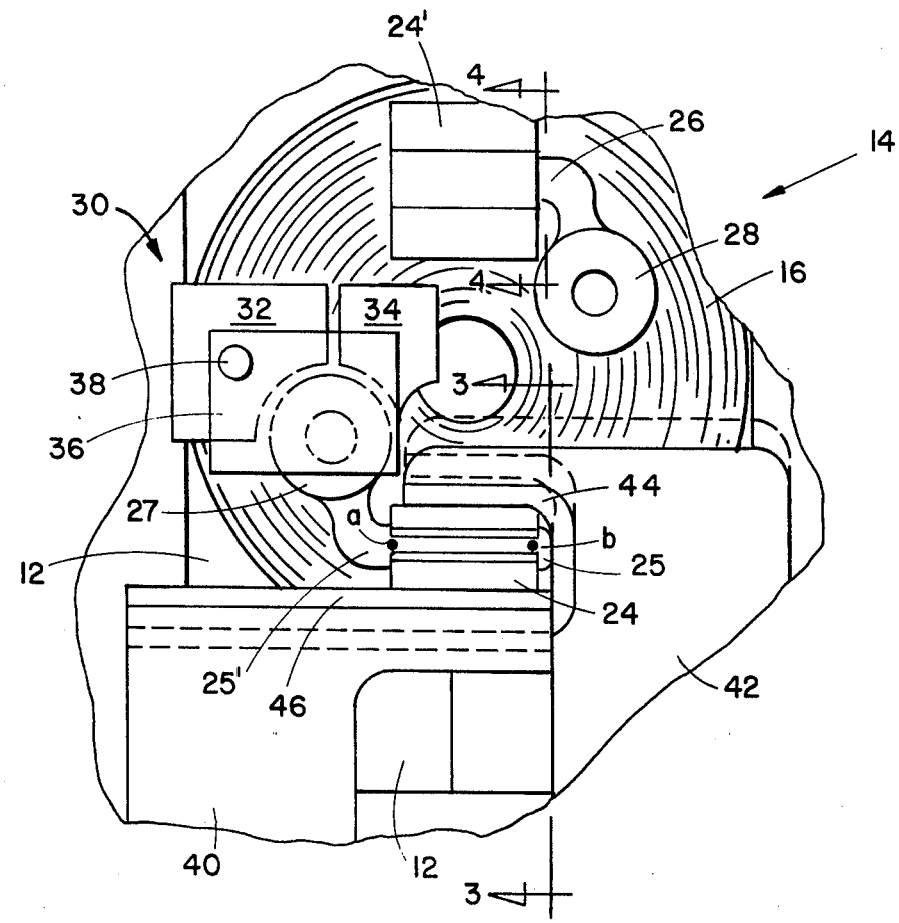
FIG. 2 is a partial, expanded view taken along section 2—2 of FIG. 1.

The mold means is defined by a pair of opposed movable jaws 40, 42 shown in the ready-to-weld position in FIG. 2, and in phantom are shown in the retracted non-weld position. The jaws 40 and 42 may be actuated in any convenient manner, such as hydraulically or pneumatically (not shown) using logic control. As the jaws are brought together, each pair of collector tabs 24 are drawn inwardly and in close proximity (preferably in intimate contact) to the sandwiched post 25 to form, together with the forward position (opposite the barrel portion) of the post, the lead parts to be welded. As disclosed in the Young et al. U.S. Pat. No. 3,806,696, the mouth portions 44, 46 of each of the jaws taken together with the rearward portion 25' of the post (adjacent the barrel), form or define an edifice or boundary around nearly the entire perimeter of the lead parts to be welded. An ingot-like mold is thus established.

Figure 3:
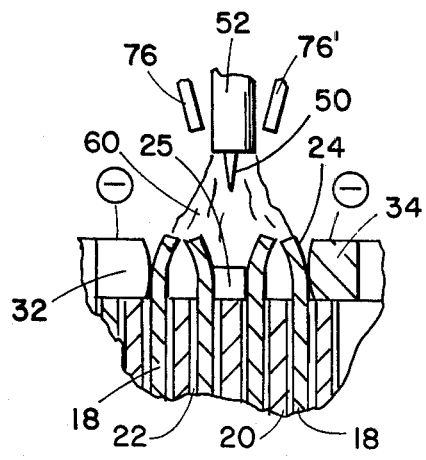
FIG. 3 is a partial sectional view taken along lines 3—3 of FIG. 2 also including a portion of the torch head.

The jaws 40 and 42 are of a material which preferably has adequate electrical conductivity, a softening point well above that of lead, good thermal conductivity (preferably at least about 0.12 cal/cm²/cm/°C/sec.) and refractory enough to be resistant to arc erosion even though normally the arc will never strike the jaws during the welding operation. It is also important that the jaws exhibit a low creep rate at the arc welding temperature. At the present time, jaws 40 and 42 are preferably made of substantially pure tungsten or a suitable alloy thereof (e.g., 2 percent thorium) since these materials best satisfy the above enumerated parameters, although it will be appreciated that other materials such as titanium, tantalum, carbon, steel or copper are generally satisfactory for the intended purpose if internal cooling is also provided, or if a surface layer of tungsten is used. One or both of the jaws may be used as the counter electrode for the welding operation, and as shown in FIG. 3 the jaws preferably serve as the negative electrode.

The welding apparatus 10 comprises a conventional inert-gas-shielded arc welding unit comprising a nonconsumable electrode torch 50 of tungsten or the like, disposed within an annular ceramic gas shield 52 and an electrode clamp 54. Current is supplied to the torch 50 via lead 56, connected to the usual power control panel and programmer (not shown). Concentrically about the electrode lead 56 there is provided an annulus 58 for circulating coolant, which may be returned through line 64. The shielding gas, e.g., argon or helium, is delivered via line 66 around the torch 50 through the ceramic shield cup 52 to provide the protective shielding atmosphere 60. The upper portions of the electrode within head 62 are also cooled by the circulating coolant. The electrode torch and feeder lines are suitably mounted to a frame 68 which is provided with vertical torch adjustments 70 and horizontal torch adjustments 72.

Air cooled magnetic head 74 together with its laterally extending probes 76, 76' produce a low frequency magnetic field that drives the coils of the electromagnetic probe and interact with the magnetic field generated by the welding arc to produce a controllable deflection of the arc. A control panel 78 is used to vary frequency, amplitude and arc position. The deflection of the arc will normally be at an angle of approximately 90° with respect to the probe fingers 76, 76' as is known. The subassembly of magnetic head and probes are mounted 61 for vertical adjustment at 80 on frame 82.

In operation of the invention, the cell holding fixture 12 with the tabs 24 and 24' protruding (and which may be pre-crimped), is positioned securely in place below the welding torch and post barrel locating clamp 30 is positioned to immobilize the post barrel by moving the spring clip 36 into position. Jaws 40 and 42 are then actuated to form the ingot-like mold and press the tabs in contiguous relationship with respect to the post, as shown in FIGS. 2 and 3. The workpiece is then positioned under the torch 50, with the middle of the post being centered preferably directly under the torch tip. The electrode torch to workpiece distance is then adjusted with adjusting bolts 70 so that the resultant electrode arc, at the workpiece, will produce a lateral dispersion having a width to cover approximately at least 80 percent and more preferably between 85 and 100 percent of the transverse width of the weldable lead workpiece comprising tabs and sandwiched post. This electrode height will also, of course, be determined by the welding amperage required to melt the lead parts sufficiently to flow and fuse in the ingot mold, and the maximum height at which the arc can be initiated. The heat from the welding current should be sufficient to cause the uppermost portions (only) of the tabs 24, 24', together with the upper portion of the lead post 25, to freely flow into at least a substantial portion of the ingot-like mold.

It is an important feature of the invention that the welding arc is struck substantially directly over the lead workpiece as opposed to striking the arc over the jaws or other location away from the surface to be welded as is customary in the art. Using the welding generator and control panel, a very large potential is applied between the torch (the positive electrode) and the workpiece which is in contact with the negative electrode, and in this manner the current path is initiated. Subsequent to application of these high voltage pulses, the current is brought up to the welding amplitude. The heat generated is applied directly to the workpiece rather than being dissipated through the mold jaws. Throughout this initial start-up, the shielding gas 60 is present, and will not only provide a cooling effect but also prevent corrosion. Of course, no flux or filler wire is used in this process.

Figure 5:
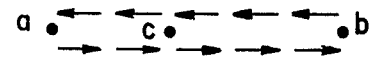
FIG. 5 is a schematic diagram representing the path of the electrode along the work piece.

Either prior to, at substantially the same time as, or most preferably after the arc has been struck, the magnetic head 74 is energized, and the frequency and amplitude is selected at the control panel 78 to cause the welding arc to oscillate from one marginal end point a, to the other marginal end point b along the surface to be welded. For instance, if the arc is struck at some initial point c (see FIG. 5), the arc is then oscillated magnetically longitudinally with respect to the lead post and tabs, with the torch head stationary, from point c to point a, and then back to point b, and then preferably reversing along the same path back to point c. This oscillation in general is effected so that greater than one full pass across path ab is made, and preferably at least one and one-half and more preferably at least two full paths are made. It has been found that multiple passes tend to improve the quality of the weld and prevent excess localized melting and uncontrolled flowing of the weld puddle.

Although the speed of oscillation of the arc longitudinally of the workpiece will be dependent upon the length of the surface to be welded as well as the mass of the lead parts, in general it is preferred to employ a frequency of oscillation between about 100 and about 300 strokes per minute, and more preferably from about 150 to about 200 strokes per minute. A stroke is defined as one complete pass across the surface to be welded.

Figure 4:
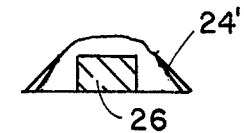
FIG. 4 is a view of a finished welded connection taken along lines 4—4 of FIG. 2.

It has also been found in accordance with the invention that the electrode arc should be oscillated in substantially a straight line longitudinally across the post, i.e., along path *ab*. This preference is to be distinguished from a lateral oscillation, as disclosed for instance in the aforementioned Smith, Jr., U.S. Pat. No. 3,646,309. The subject process is primarily an oscillating line weld using an ingot-like mold which functions not only as the counter electrode, but also as a very efficient controllable heat sink of extremely high thermal conductivity. The walls of the jaws act to rapidly cause the leading edges or peripheral extensions of the flowing lead to cool inwardly toward the centroid of the weldable lead parts. In this manner, a relatively thick ingot-like weld bead, as shown in FIG. 4, is obtained with a minimum of effort. Furthermore, the subject invention, by starting the torch directly over the workpiece, the jaws are not unduly heated, as disclosed in the aforementioned Young et al U.S. Pat. No. 3,806,696, which resulted in partially defeating the capability of the jaws to act as a heat sink. In the subject invention substantially all of the heat generated by the torch is applied directly, and selectively, to only those portions of the lead parts which are desired to be melted.

After the first weld has been made, as shown at the top of FIG. 2, the remaining set of post and tabs is then welded. After each weld has been made, it is unnecessary to employ peening or to remove slag inasmuch as no flux or filler rod has been used for which slag would be created. After welding, the jaws are retracted, the barrel post jig removed, and the cell is then ready for the next assembly step.

It should be understood that the invention is capable of a variety of modifications and variations which will become apparent to those skilled in the art upon reading the specification. Such modifications are intended to be encompassed within the scope of the invention as defined by the appended claims. For instance, the electrode arc could alternatively be oscillated longitudinally of the workpiece by mechanical means rather than magnetically, however, it is preferred to minimize moving parts.

What is claimed is:

1. In a method for joining lead parts together in a lead-based battery by passing an electrode arc derived from an inert-gas-shielded, non-consumable electrode across the lead parts to at least partially melt them, and wherein the flow of the melted lead parts is contained by a mold means of sufficiently high thermal conductivity to act as a rapid heat sink, and which surrounds the lead parts, the improvement comprising:

striking the electrode arc substantially directly over the lead parts; and passing the electrode arc in substantially a straight line over the lead parts longitudinally thereof, in excess of one full pass across the lead parts, at a speed and current to cause the lead parts to flow and weld together and be confined by the mold means.

2. The method of claim 1 wherein the electrode arc is oscillated longitudinally over the lead parts at a frequency between about 100 and about 300 strokes per minute.

3. The method of claim 2 wherein at least two full passes of the arc are made longitudinally over the lead parts.

4. The method of claim 2 wherein the electrode arc is oscillated magnetically with magnetic probes positioned on either side of the electrode 90° to the longitudinal direction of the lead parts.

5. The method of claim 1 wherein the lead parts are electrode tabs straddling an elongated lead post of high heat capacity relative to the tabs, and the electrode to lead parts distance is such that the electrode arc will be laterally dispersed at the lead parts to cover at least about 80 percent of the transverse width of the lead parts.

* * * * *